United States Patent
Sen et al.

(10) Patent No.: US 8,065,677 B2
(45) Date of Patent: Nov. 22, 2011

(54) METHOD, DEVICE, AND SYSTEM FOR SEAMLESS MIGRATION OF A VIRTUAL MACHINE BETWEEN PLATFORMS WITH DIFFERENT I/O HARDWARE

(75) Inventors: Sujoy Sen, Portland, OR (US); Gregory D. Cummings, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 908 days.

(21) Appl. No.: 12/056,136

(22) Filed: Mar. 26, 2008

(65) Prior Publication Data

US 2009/0249366 A1    Oct. 1, 2009

(51) Int. Cl.
*G06F 9/455* (2006.01)
(52) U.S. Cl. .......................................................... 718/1
(58) Field of Classification Search ........................ 718/1
See application file for complete search history.

(56) References Cited

U.S. PATENT DOCUMENTS

| | | | |
|---|---|---|---|
| 7,434,215 B2 * | 10/2008 | Boykin et al. | 717/169 |
| 7,895,594 B2 * | 2/2011 | Kirilline et al. | 718/1 |
| 2003/0033443 A1 * | 2/2003 | Igotti | 709/328 |
| 2008/0263258 A1 * | 10/2008 | Allwell et al. | 711/6 |
| 2009/0276318 A1 * | 11/2009 | Broadbent et al. | 705/14.64 |

* cited by examiner

*Primary Examiner* — Andy Ho
(74) *Attorney, Agent, or Firm* — Derek J. Reynolds

(57) ABSTRACT

A method, apparatus, system, and computer readable medium are disclosed. In one embodiment the method includes detecting a virtual machine (VM) attempting to communicate with a device coupled to a computer system using a first software plug-in interface that is incompatible with the device. The method continues by temporarily removing the VM from controlling system. Then the first software plug-in interface in the VM is replaced with a second software plug-in interface, which is compatible with the device, without the knowledge of the VM. Then control is returned to the VM and the VM is allowed to resume the communication attempt with the device using the second software plug-in interface.

25 Claims, 3 Drawing Sheets

METHOD, DEVICE, AND SYSTEM FOR SEAMLESS MIGRATION OF A VIRTUAL MACHINE BETWEEN PLATFORMS WITH DIFFERENT I/O HARDWARE

FIELD OF THE INVENTION

The invention relates partitioned drivers in a virtualized environment.

BACKGROUND OF THE INVENTION

Virtualization technology allows a guest operating system (OS), running on a guest virtual machine (VM), to run under the supervision and control of a host OS (referred to in different contexts as a hypervisor or a virtual machine manager (VMM)). There may be multiple guest VMs (with multiple guest OSs) running in a single computer system (i.e. computer platform), each being allocated a certain amount of dedicated memory space and computational time in the system. There are many occasions where it is desirable for a guest OS/VM running on one physical computer system to be migrated over to another physical computer system.

In order to enable seamless migration of a guest OS/VM between two different physical computer systems, the hypervisor may expose an emulated hardware layer to the guest OS/VM. Thus, even if underlying physical hardware changes during the migration, the guest OS/VM would see the same hardware components before and after the migration.

In input/output (I/O) technology space, it is common for an emulation layer exists that shows a guest OS/VM an emulated generic I/O device in the computer system instead of the actual physical hardware device. Therefore, the hypervisor is required to translate all commands and accesses between the guest OS/VM and the virtual I/O device to commands and accesses compatible with the real hardware I/O device on the platform. This translation scheme creates a performance impact.

To eliminate the emulation layer performance impact, a physical I/O device present on the platform may be directly exposed to the guest OS/VM. But this can lead to issues such as scalability, isolation, and mobility. In the context of scalability, it is difficult to efficiently assign a limited number of I/O devices on a platform to a large number of guests. With isolation, it is also difficult to ensure a specific I/O device will only be allowed to access the appropriate guest OS/VM address space. And as far as mobility, migrating a guest OS/VM between machines with disparate I/O devices also causes problems that are difficult to fix seamlessly.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Figure 1:
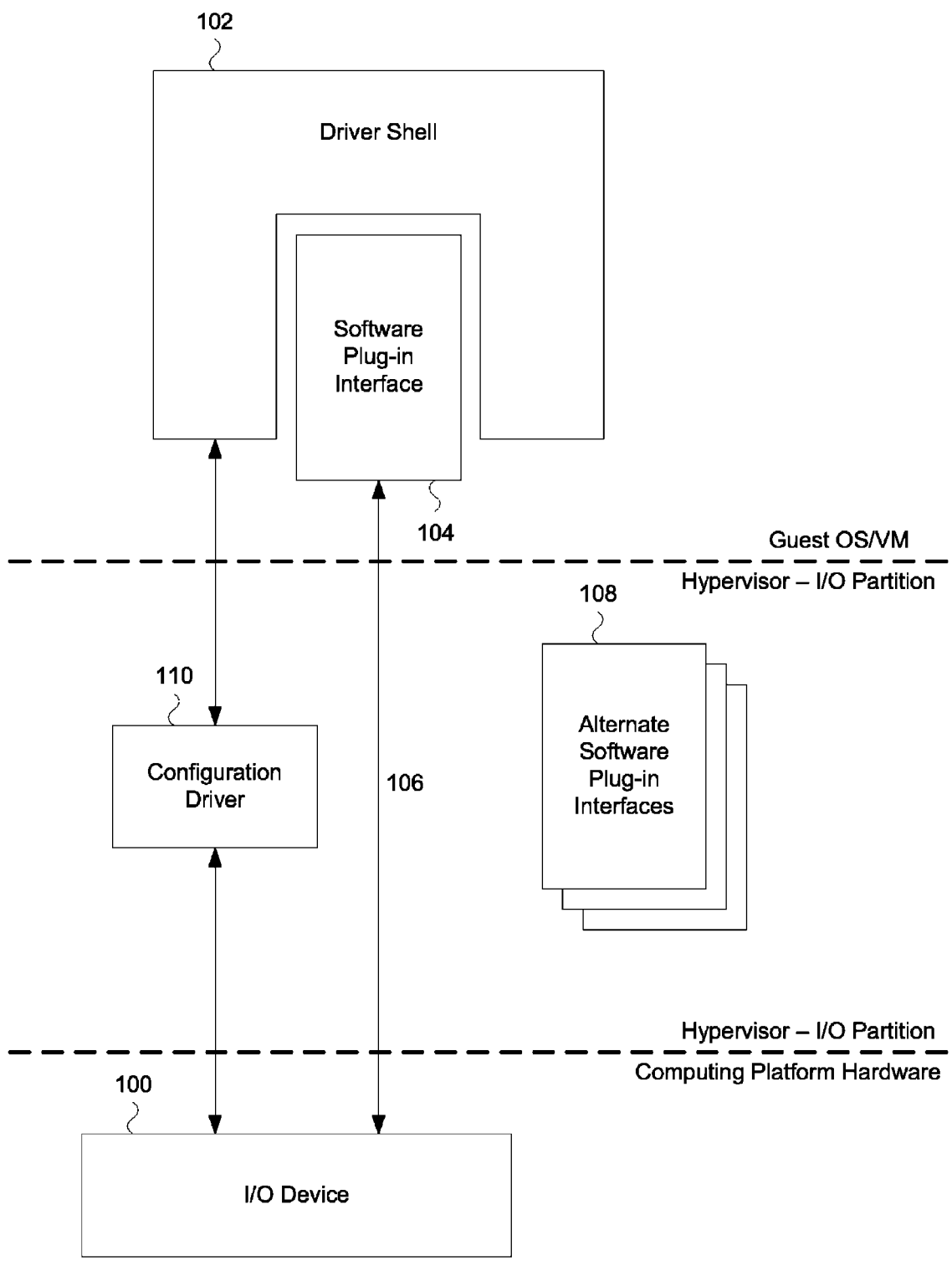
FIG. 1 illustrates an embodiment of a system implementing a direct access partitioned I/O device driver.

Embodiments of a method, apparatus, system, and computer readable medium for a direct access partitioned driver to allow transparent guest virtual machine (VM) mobility with minimal input/output (I/O) performance impact are described. Many of the embodiments disclosed include a partitioned virtual I/O device driver. One partition of the virtual I/O device driver is a guest VM/OS-specific driver shell (referred to as the "driver shell") and the other partition is a software plug-in interface (SPII). These two partitions of the virtual I/O device driver reside in two separate memory space partitions in a virtualization-based computer platform. Notably, the driver shell is stored within the memory space of a guest VM residing on the computer platform. And the SPII (or multiple SPIIs) that is compatible with an I/O hardware device on the computer platform is stored within the memory space of a separate I/O partition on the computer platform. In some embodiments, the separate I/O partition may be a portion of a hypervisor residing on the computer platform that specifically deals with I/O functionality. In other embodiments, the I/O partition may be in a separate memory space than the hypervisor and accessible by the hypervisor.

The driver shell implements the driver interfaces between the driver and the guest OS that is running on the guest VM. As mentioned above, the driver shell is specific for a certain guest VM and guest OS running on the guest VM. For example, if the I/O device is a network I/O device, one required interface may include the Network Driver Interface Specification (NDIS) layer if the guest VM runs a Microsoft® Windows® OS environment. The driver shell also manages the resources acquired from the guest VM for both itself as well as the (SPII). The driver shell provides a specific shell interface that a SPII can utilize to make requests for system resources such as memory. The driver shell also provides a direct hardware access scheme for various status indicators a driver would utilize. The driver shell also provides a channel for certain communications to the hypervisor.

The role of the SPII is to interact with physical or emulated hardware device in the data path to and from the device. The SPII includes all software interaction code that is specific to a certain hardware device, which allows the SPII the capability to interact directly with the hardware device. Additionally, the SPII does not directly interact with the guest OS or guest VM, rather the communication between the SPII and the guest OS/VM is indirect and handled by the driver shell as an intermediary.

When the guest OS/VM migrates from one computing platform to another computing platform, the underlying I/O hardware device might be different. Thus, prior to migration, the hypervisor disallows the SPII to communicate with the underlying I/O hardware device and then migrates the guest OS/VM.

In a network I/O device example, upon migration to a new computer platform, a transmit hang condition will potentially occur because the SPII will continue to attempt to talk to the underlying I/O hardware device, but the hypervisor will not allow the communication to reach the device. This condition is the result of a communication transmission being sent to the new I/O device from the SPII, but the SPII does not receive a response. The SPII alerts the driver shell of this condition and soon thereafter the driver shell, to remedy the situation, will attempt to reset the new I/O hardware device by sending a device reset command to a configuration driver (with direct I/O hardware device access) residing in the I/O partition.

Upon receiving the reset command, the hypervisor, which controls all of the computing platform resources, removes the guest OS/VM from any control over the computing platform and remaps the one or more memory pages the driver shell utilizes for the location of the SPII code. The remapped one or more memory pages now have the location of another SPII, which is compatible with the new I/O hardware device. The hypervisor also allows the configuration driver to initiate the device reset initially requested by the driver shell. With the driver shell now targeting the new SPII, the hypervisor relinquishes control of the computing platform back to the guest OS/VM. The guest OS/VM sees the device reset occur and begins communication with the device using the new SPII, which is now accessible after the remapping. The guest OS/VM is unaware that the SPII its driver shell interacts with has changed because the common interface between the two partitioned sides of the driver have not changed, only the software interaction code within the SPII has changed, which the driver shell does not have access to.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

FIG. 1 illustrates an embodiment of a system implementing a method to access hardware directly through with a partitioned I/O device driver. In many embodiments, the system is a general purpose computing platform. The computing platform may be a server, a desktop computer, a laptop computer, a mobile handheld device, or a set-top box, among others. General components of the computing platform that are not shown in FIG. 1 may include processors, memory, memory controllers, interconnects, and I/O host controllers. Specifically, embodiments of the computing platform include one or more processors, each with one or more cores. The computing platform also includes a memory, which may be comprised of one or more types of dynamic random access memories (DRAM) such as synchronous DRAM (SDRAM) or double data rate (DDR) SDRAM, among others. One or more memory controllers may also be present in the computer system to control access to the memory. These memory controllers may be located within one or more of the processors or elsewhere in the computing platform. The processors and memory are coupled together through one or more interconnects that pass address, data, clock, and control signals between these components across signal lines.

In many embodiments, the computing platform also includes an I/O subsystem, which may comprise one or more I/O host controllers that send and receive data between the processors/memory and one or more I/O devices, such as I/O device 100. I/O device 100 may be one of many types of I/O devices in different embodiments. In some embodiments, I/O device 100 refers to an actual physical hardware I/O device. In other embodiments, I/O device 100 is an emulated I/O device (e.g. a device emulated by the hypervisor for the benefit of multiple VMs in a virtualization environment). In some embodiments, I/O device 100 is a network I/O device that sends and receives network traffic between the computing platform and a network. The network may be a wired network (such as a local area network (LAN) coupled together with Ethernet cables), or a wireless network (such as an IEEE 802.11 series wireless protocol network.

The computing platform system memory includes a hypervisor (i.e. a virtual machine monitor/manager—VMM). The hypervisor supervises (i.e. controls) one or more guest virtual machines (VM) by controlling access to the resources of the computing platform. These resources include items such as memory space and computational time. The hypervisor can partition system memory into multiple independent memory spaces. For example, if there are two guest VMs running on the system, the hypervisor may allocate a certain percentage of memory space to each of the two guest VMs as well as keep another percentage of memory space for itself. In many embodiments, a portion of the memory space the hypervisor keeps for itself will include an I/O partition, which, as stated above, is accessible by the hypervisor and specifically deals with I/O functionality. In other embodiments, the I/O partition is integrated into hypervisor memory space.

These separately allocatable memory spaces may be utilized by each entity (the two guest VMs and the hypervisor) to store their respective software code/kernels as well as extra operational space for buffers, drivers, and other operation-specific required resources. For example, each guest VM may have a guest operating system (OS) running on top of the VM that utilizes the memory space of the respective VM it resides on top of. The guest OS may manage any drivers for underlying I/O devices accessible by the VM. In many embodiments, these drivers may include virtual drivers that talk with a physical I/O device driver that resides in the hypervisor's I/O partition.

In the embodiment shown in FIG. 1, there are two partitioned memory spaces, a memory space that includes components of the hypervisor (shown in the middle of FIG. 1 between the upper and lower dotted lines), and a memory space that includes components of the guest VM (shown at the top of FIG. 1 above the upper dotted line). The third portion of FIG. 1 (the portion below the lower dotted line) represents a portion of the physical hardware residing within the computing platform (notably I/O device 100).

The guest VM includes a driver shell 102 and a pre-migration SPII 104. The driver shell 102 interacts directly with the guest OS that is running on top of the guest VM. Because a migration that occurs for a guest VM also migrates the guest OS running on top of the guest VM, yet the driver shell 102 interacts directly with the guest OS specifically, the guest OS and guest VM may be envisioned as a guest OS/VM entity. Thus, it is will be viewed as acceptable to interchangeably refer to the guest OS/VM entity as the guest OS, the guest VM, or the guest OS/VM, unless specifically referred to otherwise. The driver shell 102 also interacts directly with the current SPII. In many embodiments, the driver shell 102 is capable of the following functions:

Implements the driver interfaces between an actual hardware driver and the guest OS/VM.

Manages the resources acquired from the guest OS/VM for both itself as well as the SPII.

Provides a specific shell interface that a SPII can utilize to make requests for system resources such as memory.

Provides a method to directly access hardware for various status indicators a driver would utilize.

Provides a channel for certain communications to the hypervisor.

In some embodiments, the driver shell 102 may provide one or more additional functions apart from the above listed functions. In other embodiments, the driver shell 102 may delegate one or more of these functions to another entity in the computing platform.

The SPII 104, in many embodiments, is capable of the following functions:

Communicates directly with a physical or emulated I/O device it matches with across data path 106 using internal device-specific software interaction code.

Communicates indirectly with the guest OS/VM through the intermediary driver shell 102.

Each SPII matches up with a specific I/O device. A driver shell 102 and SPII 104 pairing comprises both sides of the direct access partitioned driver (DAPD) scheme. There is a current SPII, SPII 104 maps to memory pages that have the SPII software interaction code. The current SPII is plugged into the driver shell 102. There are also potentially a number of alternate SPIIs that comprise the group of SPIIs 108, each of which reside in hypervisor memory space. Each alternate SPII contains the device-specific software interaction code for a unique I/O device. As stated, in many embodiments, each SPII (SPII 104 as well as SPIIs 108) maps to one or more pages in memory. In many embodiments, each SPII begins at the start of a page of memory and each SPII contains uniformly-sized software interaction code. Thus, in these embodiments, if the memory pages that point to the first SPII 104 are remapped to a second SPII that is in the group of SPIIs 108, all software interaction code fields match between the new and old SPII within the swap and the driver shell 102 may interact with both SPIIs (or any number of SPIIs) in a uniform manner.

In many embodiments, the group of SPIIs 108 reside in hypervisor memory space. Additionally, a configuration driver 110 also resides in hypervisor memory space. The configuration driver is controlled directly by the hypervisor and has direct access to the physical I/O device 100.

Figure 2:
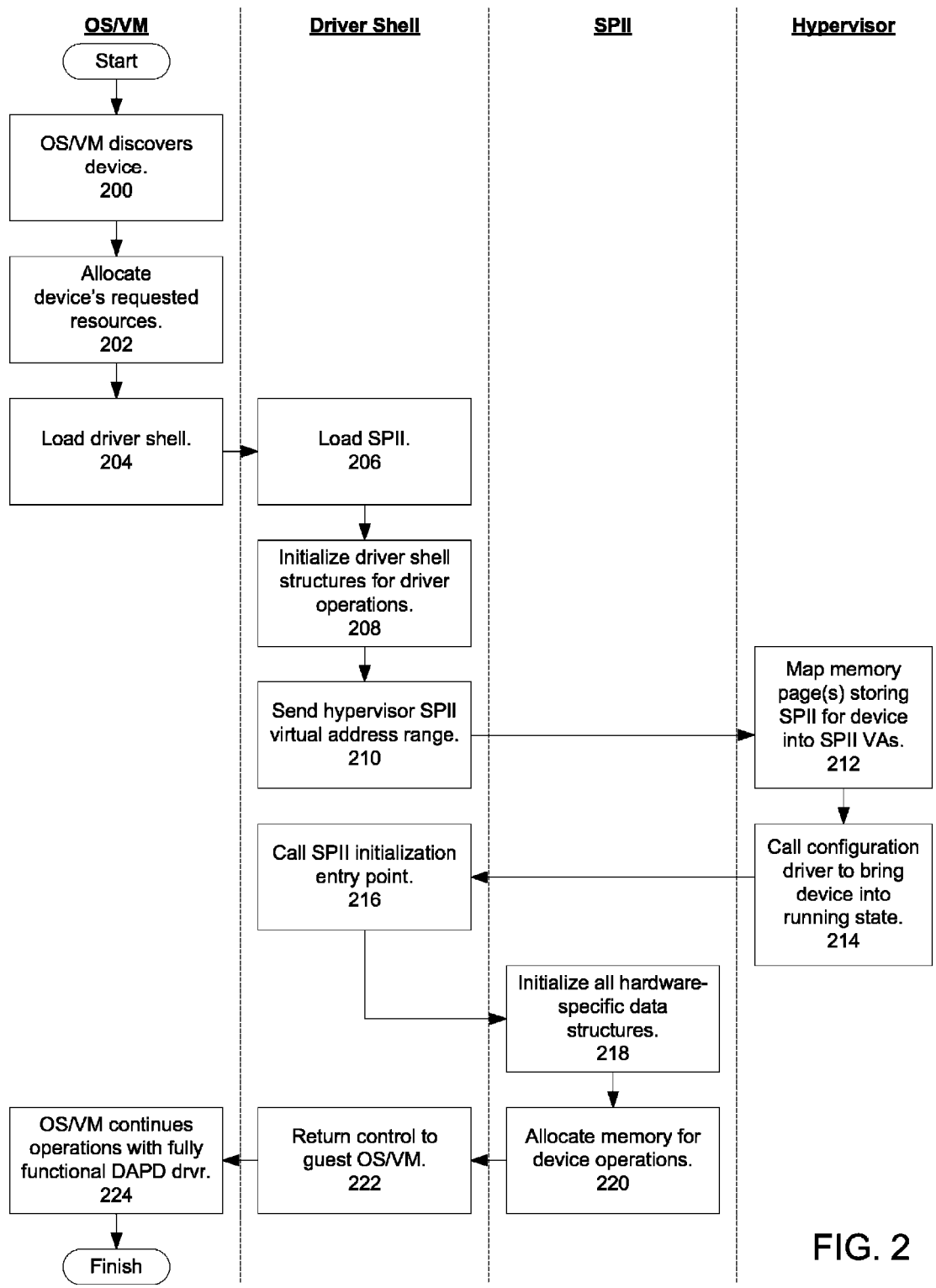
FIG. 2 is a flow diagram of an embodiment of a process to initiate the direct access partitioned driver.

FIG. 2 is a flow diagram of an embodiment of a process to initiate the direct access partitioned driver. The process can be performed by processing logic that may be hardware, software, or a combination of both. The embodiment described in FIG. 2 describes each particular block in the process flow as being performed by a certain component within the computing platform, namely the guest OS/VM, the driver shell, the SPII, or the Hypervisor (each component's tasks are divided into vertical columns in the entire process, where each column is headed by one of the four listed component names. In some additional embodiments, some or all of these blocks may be performed by other components within the computing platform.

Turning now to FIG. 2, the process begins by processing logic within a guest OS running on a guest VM discovering a DAPD-enabled device (processing block 200). The DAPD-based device may be a hardware emulation of a physical device or the physical device itself. In many device emulation embodiments, the DAPD device emulation supports configuration registers to provide control over the device. In some embodiments, these configuration registers may be provided as standard PCI configuration registers. Though, in other embodiments, other types of configuration register sets may be utilized.

The device may indicate the required resources for normal operations through the configuration registers. In many embodiments, the guest OS/VM will always see the same device (as well as Vendor ID among other possible device identifications) regardless of the underlying I/O device hardware that the direct access partitioned-driver is utilizing.

Next, processing logic in the guest OS/VM allocates the device's requested resources (processing block 202). The requested resources are determined based on the configuration register requirements as discussed above regarding processing block 200. The process in FIG. 2 assumes that the resources the device requests are available. If this is not the case, the process would cease at this point because the computing platform does not have the resources required to operate the device.

Then processing logic loads the driver shell (processing block 204). Once the driver shell is loaded, processing logic within the VM hands over control of the system to the driver shell. The driver shell then loads the SPII (processing block 206). The SPII should be capable of interacting with the device. The driver shell then will begin initialization of the device (processing block 208). The driver shell then determines the virtual address space of the loaded SPII and sends this range of addresses to the hypervisor (processing block 210). The virtual addresses of the current SPII interacting with the driver shell include the pages in virtual memory that store the code pages of the interactive software code within the driver that interface with the device. Thus, the device-specific portion of the driver, which comprises the SPII, is located at the virtual address range sent to the hypervisor.

The driver shell then transfers control to the hypervisor. In many embodiments, this transfer may be accomplished indirectly without the knowledge or consent of the driver shell. For example, this indirect transfer of control may happen as the result of a standard register access that occurs during the operation of the driver shell. The hypervisor can wait for the specific register access and then trap the access and take over control of the computing platform.

Once the hypervisor has taken over control of the computing platform and having already received the SPII virtual address range, the hypervisor can then determine whether the specific code pages within the SPII virtual address range are the correct pages for the current device. If this is the case, then the hypervisor can continue initialization of the device (not shown). If this is not the case, the hypervisor can map memory pages storing device-specific SPII code pages into the virtual address space received from the driver shell (processing block 212). At this point, the SPII virtual address range contains the correct SPII code pages that are compatible with the device. Next, the hypervisor calls a configuration driver, which interfaces directly with the device hardware, to bring the device into a running state (processing block 214). The configuration driver exists in the hypervisor memory space. The hypervisor can then return control to the driver shell because at this point the hypervisor is assured that the SPII code pages are compatible with the I/O device.

With control returned to the driver shell, the driver shell can now call the SPII initialization entry point (processing block 216). This entry point is a location in the code pages of the SPII that contains the initial operation to start an initialization of the I/O device hardware. By calling the SPII entry point, the driver shell passes control to the SPII itself. The SPII then initializes all hardware-specific data structures needed for operating the I/O device (processing block 218). Then the SPII allocates additional memory to handle standard device operations (processing block 220). For example, this additional memory may include space for buffers for I/O device operations.

Once all hardware-specific device resources have been initialized and allocated for the I/O device, then the SPII can return control to the driver shell, which returns control to the guest OS/VM (processing block 222). Finally, with the guest OS/VM regaining control, it can continue operations with a fully functional initialized direct access partitioned driver for the I/O device (processing block 224 and the process is finished.

Figure 3:
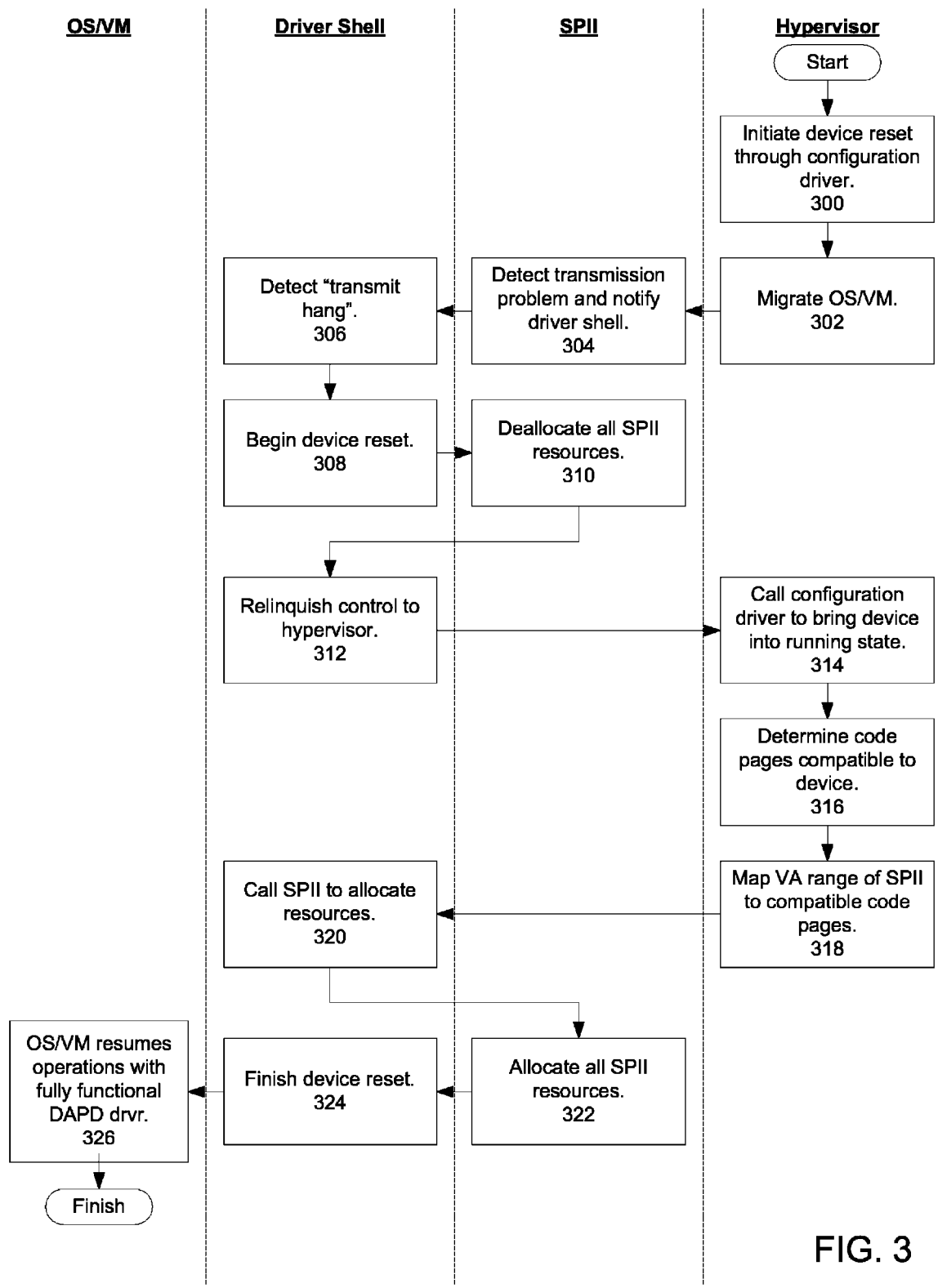
FIG. 3 is a flow diagram of an embodiment of a process to migrate a guest OS/VM using a direct access partitioned driver.

FIG. 3 is a flow diagram of an embodiment of a process to migrate a guest OS/VM using a direct access partitioned driver. In many embodiments, a guest VM, with a guest OS running on the guest VM, is to be migrated from a first computing platform (source platform) to a second computing platform (target platform). In many of these embodiments, the source platform utilizes a first I/O device for a specific function (e.g. a network I/O device) and the target platform utilizes a second I/O device for the same function. In certain examples, these two I/O devices, although utilized for the same function, are not driver compatible. Thus, there is a need to swap at least hardware-specific portions of the driver during the guest OS/VM migration.

The process in FIG. 2 can be performed by processing logic that may be hardware, software, or a combination of both. The embodiment described in FIG. 2 describes each particular block in the process flow as being performed by a certain component within the computing platform, namely the guest OS/VM, the driver shell, the SPII, or the Hypervisor (each component's tasks are divided into vertical columns in the entire process, where each column is headed by one of the four listed component names. In some additional embodiments, some or all of these blocks may be performed by other components within the computing platform.

During guest OS/VM migration, processing logic within the hypervisor initiates a device reset for the I/O device on the target platform via a configuration driver residing within hypervisor memory space on the target platform (processing block 300). This reset can be any one of a number of different forms of device reset in different embodiments. For example, if the I/O device is a peripheral component interconnect (PCI) device, the hypervisor may initiate a PCI function level reset (either an emulated reset or a physical reset). This reset will cause the I/O device to stop transmitting or receiving data from the hypervisor and guest OS/VM. Any subsequent access to the I/O device from the current implemented SPII will be ignored by I/O device.

At this point the hypervisor can migrate the guest VM with the guest OS running on it (processing block 302). The guest OS/VM is migrated in a manner specific to the standard migration procedures generally implemented by the hypervisor. This includes the transfer of SPII code page virtual address ranges among other data. The hypervisor then transfers control of the computing platform to the guest OS/VM, driver shell, and SPII for normal operations.

After the VM has migrated, any memory-mapped I/O (MMIO) access made by the current SPII is trapped by the hypervisor and/or the I/O device itself. There is no response from I/O device to the current SPII. Thus, the current SPII will notify the driver shell that it detects a transmission problem between the current SPII and the I/O device (processing block 304). The driver shell, either immediately or after a predetermined time where no responses are received from the I/O device, will detect a "transmit hang" event (processing block 306). In different embodiments, the transmit hang event may be one of many different communication transmission events that signify a transmission error has occurred between the current SPII and I/O device. The length of time the driver shell waits before making a determination that a transmit hang event has taken place may vary in different embodiments.

Once the transmit hang event has been detected, the driver shell begins a device reset or device initialization procedure in an attempt to restart transmission between the current SPII and the I/O device (processing block 308). The driver shell transfers control to the current SPII. At this point the SPII deallocates all SPII resources (i.e. memory buffers, etc.) (processing block 310). Once the current SPII has deallocated all resources and control has been returned to the driver shell, the driver shell in turn passes/relinquishes control to the hypervisor (processing block 312). This relinquishing of control again may or may not be voluntary. The hypervisor has the capability of trapping specific general commands or register access that the driver shell attempts to make to the configuration driver and upon seeing the key command/access, removes all control the driver shell has over the computing platform. When the hypervisor has control of the system the guest OS/VM (and the driver shell and SPII) no longer have any computational time slices in the computing platform and, in essence, exist in a state of suspended animation while the hypervisor controls the computing platform.

Once processing logic within the hypervisor has full control it will first call the configuration driver to bring the I/O device into a running state (processing block 314). This removes the I/O device from an initialization/reset state. Then the hypervisor will examine a locally stored group of code pages where the specific SPII code pages compatible with the I/O device reside. The hypervisor determines the specific code pages to use that match the device from the group of code pages (processing block 316). In other embodiments, there is only one set of code pages instead of a group of sets of code pages and the one set is compatible with I/O device.

Once the hypervisor has identified the new compatible code pages, the hypervisor then maps the compatible code pages within memory into the SPII virtual address space (processing block 318). The code pages are mapped to the virtual address range of the SPII. Thus, although from the driver shell point of view nothing has changed related to the SPII, the SPII now contains code pages that were remapped from a location in hypervisor memory space that contains the compatible code pages.

At this point MMIO hardware accesses are once again allowed from the SPII to the I/O device address range. Thus, now the hypervisor relinquishes control of the computing platform back to the driver shell. The driver shell then calls the newly remapped SPII to allocate resources for data transmission between the SPII and the I/O device (processing block 320). The SPII then allocates all the appropriate resources for the I/O device (processing block 322) and immediately returns control to the driver shell. The driver shell finishes any remaining device reset/initialization steps (processing block 324) and then returns control to the guest OS/VM for normal operations with a fully functional direct access partitioned driver and I/O device (processing block 326) and the process is finished.

Thus, embodiments of a method, apparatus, system, and computer readable medium for a direct access partitioned driver through to allow transparent guest virtual machine (VM) mobility with minimal input/output (I/O) performance impact are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:
1. A method, comprising:
 detecting a virtual machine (VM) attempting to communicate with a device coupled to a computer system using a first software plug-in interface, stored within one or more pages in a memory in the computer system, for the device, the first software plug-in interface being incompatible with the device;
temporarily removing any control the VM has over the computer system;
replacing the first software plug-in interface in the VM with a second software plug-in interface, stored within one or more alternate pages in the memory, that is compatible with the device, without the knowledge of the VM;
returning control of the computer system to the VM; and
allowing the VM to resume the communication attempt with the device using the second software plug-in interface.

2. The method of claim 1, further comprising:
storing the second software plug-in within a input/output (I/O) partitioned memory space on the computer system accessible by a hypervisor.

3. The method of claim 2, wherein the VM further comprises a driver shell to interface with a plurality of software plug-in interfaces.

4. The method of claim 3, further comprising:
entering a transmit hang condition between the first software plug-in interface and the device during the initial communication attempt;
the driver shell sending a device reset request to the hypervisor to reset the device in response to the transmit hang condition; and
the hypervisor temporarily removing any control the VM has over the computer system in response to the received device reset request.

5. The method of claim 1, wherein removing any control the VM has over the computer system further comprises:
prohibiting the VM from performing operations by not allocating any slices of computational time on the computer system for the VM.

6. The method of claim 1, wherein replacing the first software plug-in interface in the VM with the second software plug-in interface further comprises:
remapping a region of the memory, accessible by the VM, from the one or more memory pages that store the first software plug-in interface to the one or more alternate memory pages that store the second software plug-in interface.

7. An apparatus, comprising:
a memory within a computer system to store a virtual machine (VM), a hypervisor, and an I/O partition, each in separately partitionable space within the memory,
wherein the VM includes a driver shell to interact with a first of a plurality of software plug-in interfaces, the first software plug-in interface being incompatible with a device communicatively coupled to the hypervisor; and
wherein the hypervisor is operable to
detect the VM attempting to communicate with the device using the first software plug-in interface;
temporarily remove any control the VM has over the system in response to the detection;
replace the first software plug-in interface in the VM with a second software plug-in interface, the second software plug-in interface being compatible with the device, without the knowledge of the VM;
return control of the system to the VM; and
allow the VM to resume the communication attempt with the device using the second software plug-in interface.

8. The apparatus of claim 7, wherein the I/O partition is further operable to store a configuration driver to initialize the device communicatively coupled to the hypervisor.

9. The apparatus of claim 8, wherein the I/O partition is further operable to store the second software plug-in interface.

10. The apparatus of claim 9, wherein the driver shell is further operable to
manage resources acquired from the VM for the driver shell and one of the plurality of software plug-ins interacting with the driver shell; and
communicate at least a device reset request to the configuration driver.

11. The apparatus of claim 10, further comprising:
the driver shell to send the device reset request to the hypervisor to reset the device in response to a transmit hang condition entered into during the communication attempt between the VM and the device; and
the hypervisor to temporarily remove any control the VM has over the computer system in response to the received device reset request.

12. The apparatus of claim 7, wherein the hypervisor is further operable to prohibit the VM from performing operations by not allocating any slices of computational time on the computer system for the VM.

13. The apparatus of claim 7, wherein the hypervisor is further operable to remap a region of the memory accessible by the VM from one or more pages in the memory that store the first software plug-in interface to one or more alternate pages in the memory that store the second software plug-in interface.

14. A system, comprising:
a network input/output (I/O) device;
a virtual machine (VM) including a driver shell to interact with a first of a plurality of software plug-in interfaces, the first software plug-in interface being incompatible with the network I/O device; and
a hypervisor to
detect the VM attempting to communicate with the network I/O device using the first software plug-in interface;
temporarily remove any control the VM has over the system in response to the detection;
replace the first software plug-in interface in the VM with a second software plug-in interface, the second software plug-in interface being compatible with the network I/O device, without the knowledge of the VM;
return control of the system to the VM; and
allow the VM to resume the communication attempt with the network I/O device using the second software plug-in interface.

15. The system of claim 14, wherein the system further comprises:
memory including memory space utilized by the VM, memory space utilized by an I/O partition, and memory space utilized by the hypervisor.

16. The system of claim 15, wherein the I/O partition is further operable to store a configuration driver to initialize the network I/O device.

17. The system of claim 14, wherein the I/O partition is further operable to store the second software plug-in interface.

18. The system of claim 17, wherein the driver shell is further operable to manage resources acquired from the VM for the driver shell and one of the plurality of software plug-ins interacting with the driver shell.

19. The system of claim 18, further comprising:
the driver shell to send a network I/O device reset request to the hypervisor to reset the network I/O device in response to a transmit hang condition entered into during the communication attempt between the VM and the network I/O device; and the hypervisor to temporarily remove any control the VM has over the system in response to the received network I/O device reset request.

20. The system of claim 14, wherein the hypervisor is further operable to prohibit the VM from performing operations by not allocating any slices of computational time on the system for the VM.

21. The system of claim 14, wherein the hypervisor is further operable to remap a region of memory accessible by the VM from one or more pages in the memory that store the first software plug-in interface to one or more alternate pages in the memory that store the second software plug-in interface.

22. The system of claim 14, wherein the driver shell and at least one of the software plug-in interfaces comprise a partitioned virtual device driver for the device, wherein the driver shell comprises a first partition of the virtual device driver and the at least one of the software plug-in interfaces comprises a second partition of the virtual device driver.

23. A non-transitory computer readable medium storing instructions, which upon execution by a processor, causes the processor to perform a method, comprising:

detecting a virtual machine (VM) attempting to communicate with a device coupled to a computer system using a first software plug-in interface, stored within one or more pages in a memory in the computer system, for the device, the first software plug-in interface being incompatible with the device;

temporarily removing any control the VM has over the computer system;

replacing the first software plug-in interface in the VM with a second software plug-in interface, stored within one or more alternate pages in the memory, that is compatible with the device, without the knowledge of the VM;

returning control of the computer system to the VM; and allowing the VM to resume the communication attempt with the device using the second software plug-in interface.

24. The computer readable medium of claim 23, further comprising:

entering a transmit hang condition between the first software plug-in interface and the device during the initial communication attempt;

sending a device reset request to the hypervisor to reset the device in response to the transmit hang condition; and the hypervisor temporarily removing any control the VM has over the computer system in response to the received device reset request.

25. The computer readable medium of claim 23, wherein replacing the first software plug-in interface in the VM with the second software plug-in interface further comprises:

remapping a region of the memory accessible by the VM from the one or more memory pages that store the first software plug-in interface to the one or more alternate memory pages that store the second software plug-in interface.

\* \* \* \* \*